(12) United States Patent
Koga et al.

(10) Patent No.: US 6,578,921 B2
(45) Date of Patent: Jun. 17, 2003

(54) SEAT RECLINING DEVICE

(75) Inventors: Yoshitaka Koga, Chiryu (JP);
Toshihiro Kimura, Toyota (JP);
Yukifumi Yamada, Toyota (JP);
Naoyuki Uryu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/974,902

(22) Filed: Oct. 12, 2001

(65) Prior Publication Data

US 2002/0050732 A1 May 2, 2002

(30) Foreign Application Priority Data

Oct. 13, 2000 (JP) ........................................ 2000-313443

(51) Int. Cl.[7] ................................................ B60N 2/02
(52) U.S. Cl. ...................... 297/362; 475/162; 475/176; 475/177
(58) Field of Search .......................... 297/362; 475/162, 475/175, 176, 177, 341

(56) References Cited

U.S. PATENT DOCUMENTS

| | | | | |
|---|---|---|---|---|
| 4,027,541 A | * | 6/1977 | Nishioka | ..................... 475/158 |
| 4,887,017 A | | 12/1989 | Ito | |
| 5,451,096 A | * | 9/1995 | Droulon | ...................... 297/362 |
| 5,718,480 A | * | 2/1998 | Schuler et al. | .............. 297/362 |
| 5,725,452 A | * | 3/1998 | Droulon et al. | .............. 297/362 |
| 5,755,491 A | * | 5/1998 | Baloche et al. | ............. 297/362 |
| 5,871,414 A | * | 2/1999 | Voss et al. | ................... 475/162 |
| 6,076,889 A | * | 6/2000 | Su et al. | ...................... 297/362 |
| 6,176,801 B1 | * | 1/2001 | Chen | ........................ 192/223.1 |
| 6,305,748 B1 | * | 10/2001 | Ohba | .......................... 297/362 |

* cited by examiner

Primary Examiner—Peter M. Cuomo
Assistant Examiner—Stephen D'Adamo
(74) Attorney, Agent, or Firm—Burns, Doane, Swecker & Mathis, LLP

(57) ABSTRACT

A seat reclining device has an external gear member and an internal gear member positioned in opposing relation, and a stopper member between the opposing gear members for regulating the reclining movement of the backrest relative to the seat cushion. The stopper member includes a first convex portion on the external gear (or internal gear) member and a stopper provided on the outer peripheral surface of the internal gear (or external gear) member. A second convex portion is also provided on the external gear (or internal gear) member. By engaging the second convex portion with a bore on a ring member that surrounds the periphery of the internal and external gear members, a part of the contact force between the stopper and the first convex portion is transmitted to the ring member.

19 Claims, 4 Drawing Sheets

SEAT RECLINING DEVICE

This application is based on and claims priority under 35 U.S.C. §119 with respect to Japanese Application No. 2000-313443 filed on Oct. 13, 2000, the entire content of which is incorporated herein by reference.

FIELD OF THE INVENTION

This invention generally relates to a seat reclining device. More particularly, the present invention pertains to a vehicle seat reclining device provided with a stopper member defining the maximum reclining range of the seat.

BACKGROUND OF THE INVENTION

A seat reclining device for adjusting the reclining movement of a backrest relative to a seat cushion of a vehicle seat for positioning the occupant to an optimal or desired seating position is widely known. A known seat reclining device includes an external gear (or internal gear) member secured to a lower arm on the seat cushion side, an internal gear member (the number of gear tooth of the internal gear and the external gear are different) having an internal gear (or external gear) which is secured to an upper arm on the backrest side and is engaged with the external gear, and an actuating member for eccentrically rotating the internal gear member relative to the external gear member.

In the aforementioned known seat reclining device, the actuating member generally actuated by an electric motor rotates the internal gear (or the external gear) relative to the external gear (or internal gear) for changing the reclining angle of the upper arm relative to the lower arm. In this way, the seatback can be moved relative to the seat cushion to vary the relative degree of recline of the seatback.

The aforementioned seat reclining device includes stopping mechanism for defining the reclining range between the maximum reclining in the forward direction and the maximum reclining in the backward direction of the backrest. U.S. Pat. No. 4,887,017 discloses a stopper member provided on a seat reclining device. The stopper member includes switches provided on the lower arm and electrical circuitry for controlling the actuator.

However, this electrical stopper member is not able to achieve accurate stop positions because the actuating mechanism has a relatively significant amount of rotational inertia. As an alternative stopping mechanism, a mechanical stopping mechanism could be provided between the lower arm and the upper arm combined with a protection circuit for excessive electric current. Such a mechanical stopping mechanism may include a stopper pin provided on the lower arm and a pair of receiving members provided on the upper arm for receiving the pin. Even in this case, however, the maximum and/or minimum reclining position is not accurate enough because the stopper member is located away from the reclining device and the stop position is affected by the possible dimensional variation of both the upper arm and the lower arm.

A need thus exists for a reclining device which is able to more accurately regulate the range of reclining movement of the backrest.

A need also exists for a stopper mechanism accommodated in the reclining device that is more simple in construction while also possessing a relatively high degree of strength.

SUMMARY OF INVENTION

To achieve the aforementioned objects, the following technical means is provided with a reclining device comprising, a first gear member secured to a lower arm, a second gear member secured to an upper arm, a first gear provided in the first gear member, a second gear provided in the second gear member, wherein numbers of gear teeth between the first gear and the second gear are different and the first gear and the second gear are provided eccentrically, a stopper member provided between the first gear member and the second gear member for restricting relative rotation between the first gear member and the second gear member, and a ring member provided on the outer periphery of the first gear member and the second gear member, wherein at least a part of a contact force on the stopper member is transmitted to the ring member via one of the gear members.

According to another aspect of the invention, a reclining device for a vehicle seat to change an angle of inclination of a seatback relative to a seat cushion includes a first gear member secured to a first arm that is adapted to be fixed to one of the seatback and the seat cushion, a second gear member secured to a second arm adapted to be fixed to the other of the seatback and the seat cushion, a plurality of first gear teeth provided on the first gear member, and a plurality of second gear teeth provided on the second gear member. The plurality of first gear teeth are different in number than the plurality of second gear teeth, and the first gear teeth and the second gear teeth are positioned eccentrically. A stopper member is provided between the first gear member and the second gear member for restricting relative rotation between the first gear member and the second gear member, and an engaging element is provided on the first gear member. A ring member encircles outer peripheral portions of the first gear member and the second gear member, and the engaging element on the first gear member engages a portion of the ring member so that at least a part of a contact force on the stopper member is transmitted to the ring member via the first gear member and the engaging element.

In accordance with another aspect of the invention, a reclining device for a vehicle seat to change an angle of inclination of a seatback relative to a seat cushion includes a first gear member secured to a first arm that is adapted to be fixed to one of the seatback and the seat cushion, a second gear member secured to a second arm adapted to be fixed to the other of the seatback and the seat cushion, a plurality of first gear teeth provided on the first gear member, and a plurality of second gear teeth provided on the second gear member. The number of first gear teeth is different from the number of second gear teeth, and the first gear teeth and the second gear teeth are positioned eccentrically. A plurality of spaced apart stoppers on the outer periphery of the first gear member and a plurality of spaced apart projections on the second gear member are adapted to effect contact with one another to restrict relative rotation between the first gear member and the second gear member. An engaging element is provided on the first gear member. A ring member encircles outer peripheral portions of the first gear member and the second gear member, and is provided with a hole in which is positioned the engaging element on the first gear member so that at least a part of a contact force between the stoppers and the projections is transmitted to the ring member via the first gear member and the engaging element.

With the reclining device of the present invention, a part of the contact force of the ring member towards the stopper member is dispersed and so smooth gear engagement can be maintained. In addition, the reclining angle can be accurately determined.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
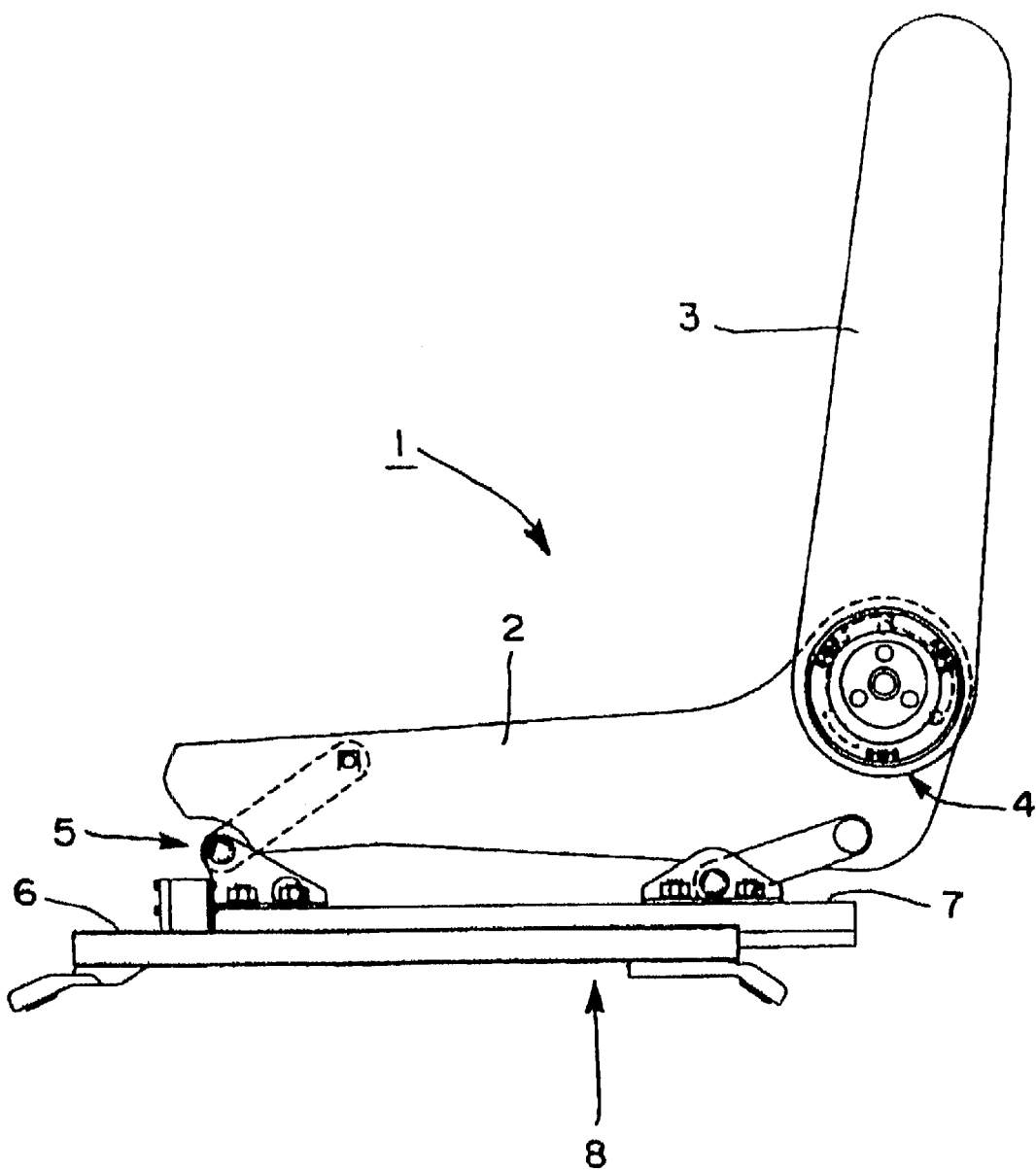
FIG. 1 is a side view of a vehicle seat in which is incorporated a seat reclining device according to an embodiment of the present invention.

As shown in FIG. 1, a seat 1 for a vehicle includes a seat cushion 2, a backrest 3, and a seat reclining device 4 for adjusting the reclining angle of the backrest 3 relative to the seat cushion 2. The vehicle seat 1 can be moved upwardly and downwardly by a lifter 5 that includes a pair of parallel link mechanisms, one end of which supports the seat cushion 2. The position of the seat 1 in the forward and reverse directions is adjustable by a seat slide device 8. The seat slide device 8 includes a lower rail 6 fixed on a vehicle floor and an upper rail 7 slidably positioned relative to the lower rail 6 for supporting the other end of the parallel link mechanism.

Figure 2:
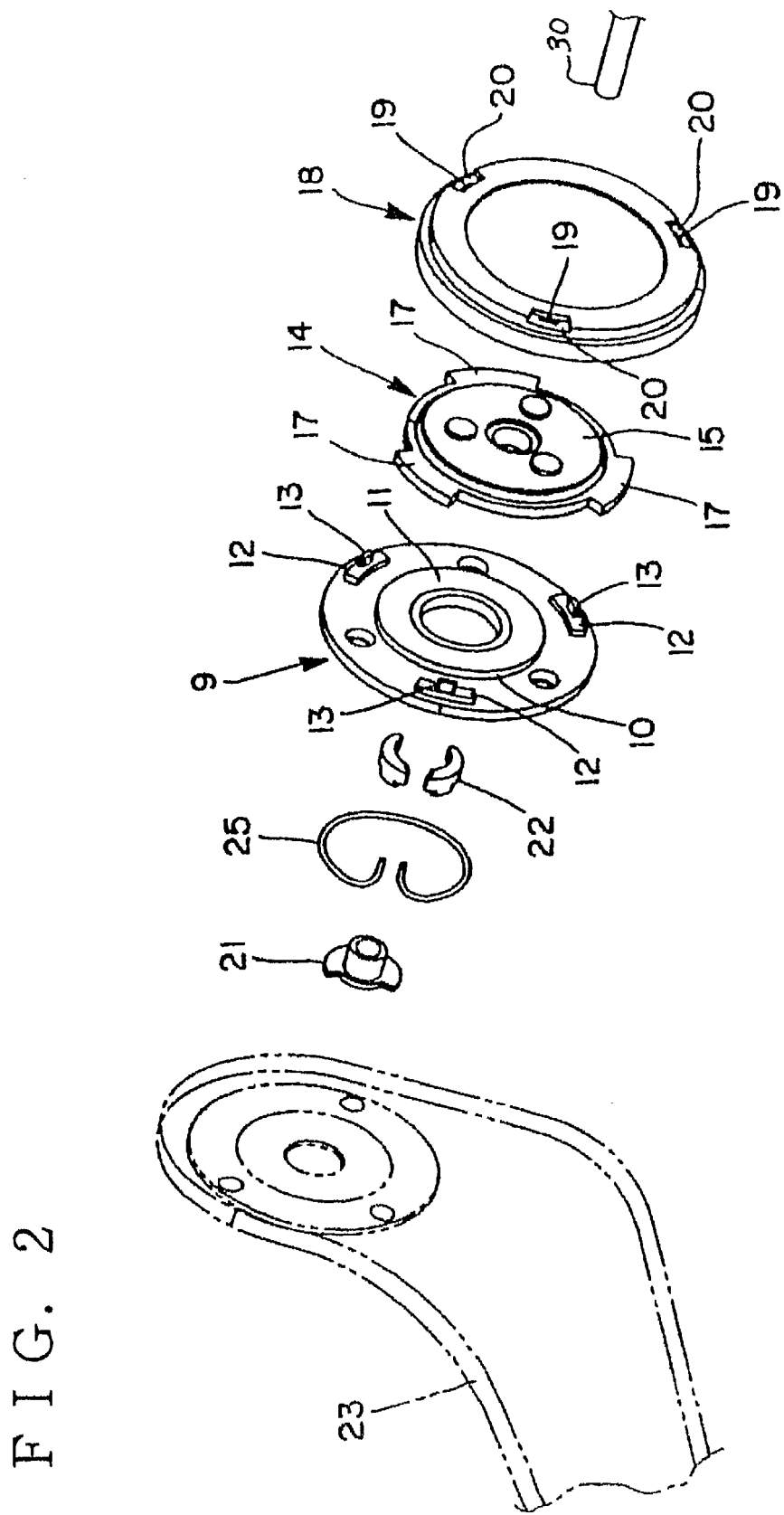
FIG. 2 is an exploded perspective view of the seat reclining device according to an embodiment of the present invention.
Figure 3:
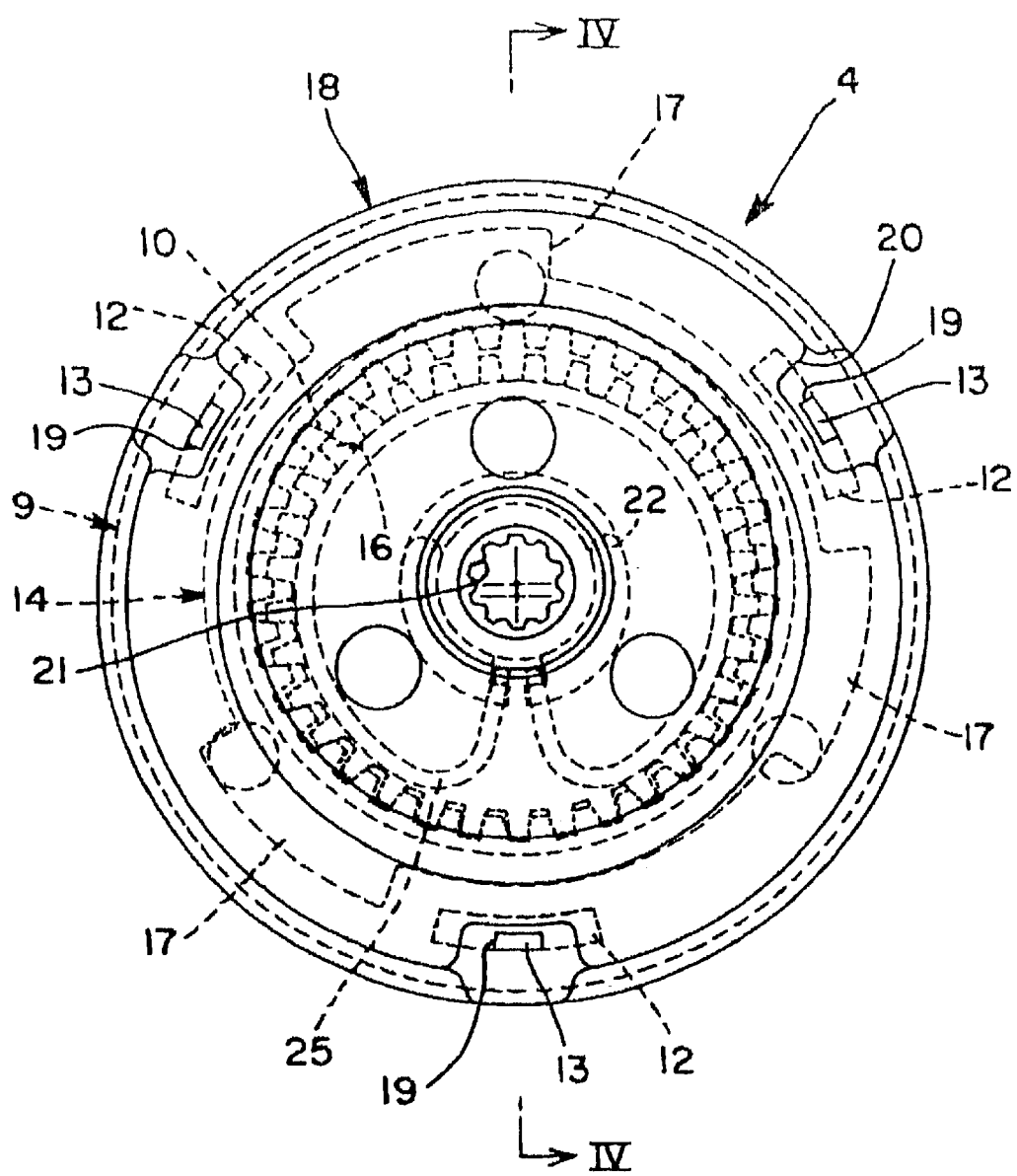
FIG. 3 is a front view of the seat reclining device shown in FIG. 2.
Figure 4:
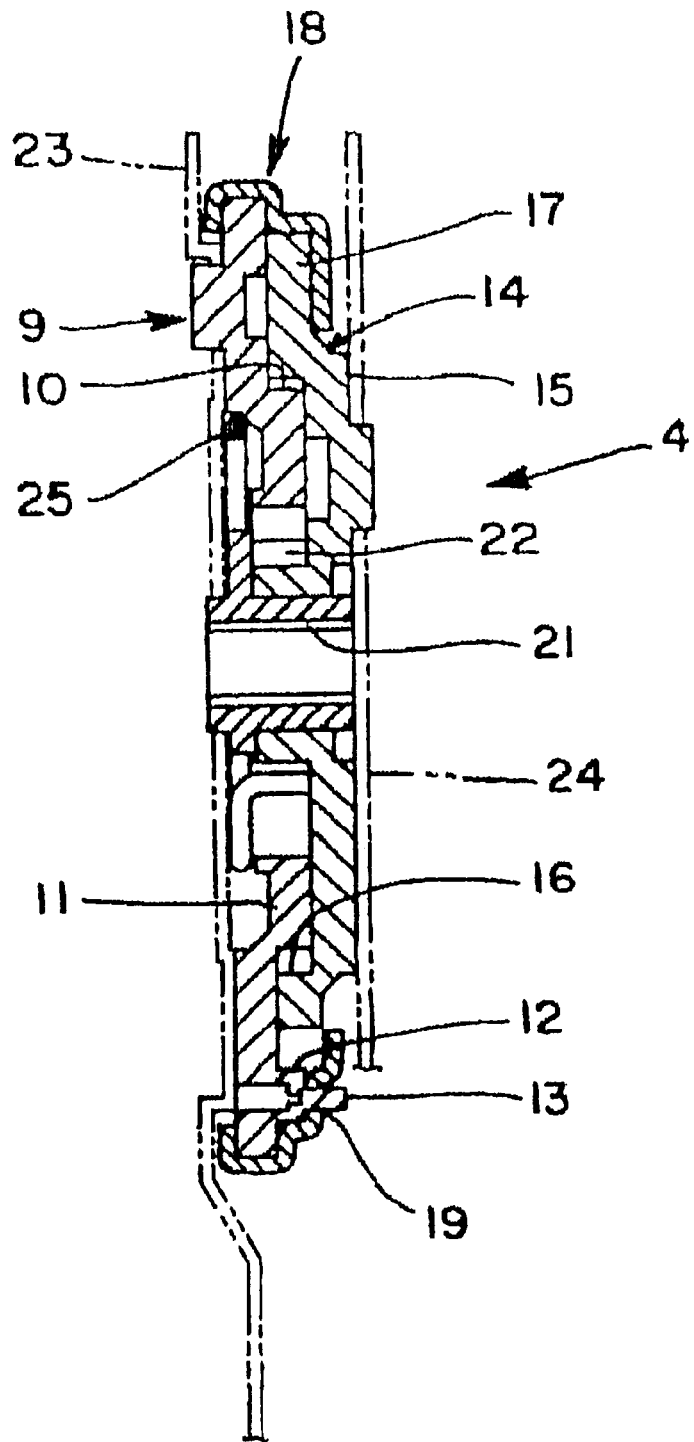
FIG. 4 is a cross-sectional view of the seat reclining device taken along the section line IV—IV in FIG. 3.

The structure associated with the seat reclining device 4 is illustrated in FIGS. 2–4. An external gear (or an internal gear) member 9 is secured to a lower arm 23 of the seat cushion 2 and is formed as a disc-shaped member. An external gear 10 is formed on the outer periphery of a half-die-cut processed annular portion 11 formed on the external gear member 9. The half-die-cutting process used to form the annular portion 11 is a kind of press forming process in which a steel plate is pressed and partially sheared in the plate thickness direction to form a concave or recessed portion on the plate while a partially continuous portion on the edge of the concave or recessed portion. A plurality of half-die-cut convex portions or projections 12 are formed on a side surface of the external gear member 9 at positions spaced radially outwardly of the annular portion 11. Further rectangularly shaped (or cylindrically shaped) convex portions or protuberances 13 are formed on the top surface of the convex portions or projections 12 and extend from the convex portions or projections 12 in the outward direction. Preferably, the convex portions or protuberances 13 are also formed by a half-die-cut process.

A disc shaped internal gear (or external gear) member 14 is secured to an upper arm 24 of the backrest 3 and is opposed to the external gear (or internal gear) member 9. The internal gear member 14 includes an annular portion 15 formed by a half-die-cutting process, an internal gear 16 formed on the inner periphery of the annular portion 15, and a plurality of spaced apart stoppers 17 extending in the radially outward direction from the outer periphery of the annular portion 15.

The outer peripheral portions of the external gear member 9 and the internal gear member 14 are covered with a ring member 18. The ring member 18 is appropriately configured to be engaged by or to receive the convex portions or protuberances 13. In the illustrated embodiment, the ring member 18 includes several holes or bores 19 into which the convex portions or protuberances 13 are inserted and positioned. The protuberances or convex portions 13 thus form engaging elements that engage a portion of the ring member 18, and the ring member 18 is appropriately configured to receive or be engaged by the engaging elements 13.

In this embodiment, each of the bores 19 in the ring member 18 is located at the central portion of respective concave or recessed portions 20 which are formed on the side surface of the ring member 18. The bores 19 are engaged with the foot portion of the convex portions or protuberances 13.

Referring to FIGS. 2–4, the external (or internal) member 9 is supported via a pair of wedge shaped members 22 and a spring 25 on a boss portion of an actuating member 21 which receives the input from the operation member. The internal gear (or external gear) member 14 is geared with the external gear (or internal gear) member 9 having one or two less gear teeth in number. The actuating member 21 and the external gear (or the internal gear) member 9 eccentrically rotate with respect to each other. As a result, the meshing condition between the external gear 10 and the internal gear 16 will be as shown in FIG. 3. In this case, the stoppers 17 are positioned between the convex portions or projections 12 of the external gear (or internal gear) member 9.

The ring member 18 for maintaining the relative positional relationship between the external gear member 9 and the internal gear member 14 is provided on the outer periphery of the external gear member 9 and the internal gear member 14. The convex portions or protuberances 13 are fixedly inserted into the bores 19 in the ring member 18.

When rotational torque is inputted to the actuating member 21 via a shaft 30 from an electrical motor (not shown), the internal gear (or external gear) member 14 which is co-centered or co-axial with the axis of the actuating member 21 rotates around the axis of the external gear (or internal gear) member 9. The internal gear member 14 is moved by the wedge shaped members in the radially outward direction. Then the internal gear member 14 is rotated relative to the external gear (or internal gear) member 9 with decreased rotational speed from that of the shaft 30 in accordance with the difference in the number of gear teeth between the external gear 10 and the internal gear 16. The upper arm 24 reclines relative to the lower arm 23 and the reclining angle of the backrest 3 is thus adjusted.

As a result, in accordance with the direction of input of the rotational torque, the backrest 3 reclines in the forward or backward direction relative to the seat cushion 2.

The range of the reclining movement is restricted by the contact of the stoppers 17 with the convex portions or projections 12. The contact force (i.e., the stopper force) of the stopper 17 to the convex portion 12 is transmitted from the convex portions or projections 12 to the external (or internal) gear member 9 and to the lower arm 23. Simultaneously, at least a part of the contact force is transmitted to the ring member 18 via the convex portions or protuberances 13. Accordingly, the strength of the convex portions or projections 12 increases and the force applied on the external gear (or internal gear) member 9 is reduced.

It is apparent from the foregoing that although the stopper member including the stopper(s) 17 and the convex portion (s) or projection(s) 12 is provided between the external gear member 9 and the internal gear member 14, because at least a part of the stopper force is transmitted to the ring member 18 via the convex portion(s) or protuberance(s) 13, excessive load is not input on the external gear member 9 and the internal gear member 14, and thus the relative rotation between the external gear member 9 and the internal gear member 14 is ensured.

This configuration is especially effective when the backrest 3 is reclined rearwardly to the maximum angle and is used, for example, as a flat bed. In this case, an excessive force may sometimes be applied on the reclining device, such as when children jump on the backrest 3. The relatively simple but strengthened stopper configuration of the present invention inhibits or substantially prevents the external and internal gear member 9, 14 from being deformed, and helps ensure that a smooth meshing engagement between the external gear 10 and the internal gear 16 is maintained.

Also, the stoppers 17 are fully accommodated in the reclining mechanism and so the reclining range is affected from dimensional variations in the backrest 3 or the seat cushion 2. An accurate reclining range is thus obtained.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the apart and scope of the present invention as defined in the claims, be embraced thereby.

What is claimed is:

1. A reclining device comprising:
   a first gear member secured to a lower arm;
   a second gear member secured to an upper arm;
   a first gear including gear teeth provided on the first gear member;
   a second gear including gear teeth provided on the second gear member, the number of gear teeth of the first gear and the number of gear teeth of the second gear being different, and the first gear and the second gear being positioned eccentrically;
   a stopper member provided between the first gear member and the second gear member for restricting relative rotation between the first gear member and the second gear member; and
   a ring member provided on an outer periphery of the first gear member and the second gear member, one of the gear members being engageable with the ring member so that at least a part of a contact force on the stopper member is transmitted to the ring member via the one of the gear members.

2. The reclining device according to claim 1, wherein the one of the gear members is engageable with the ring member by way of a convex portion provided on a side of the first gear member or the second gear member that is engaged with a bore in the ring member.

3. The reclining device according to claim 2, wherein the stopper member comprises a plurality of radially extending stoppers on an outer peripheral portion of the first gear member or the second gear member and a plurality of projections adapted to effect contact with the stoppers and provided on a side of the other of the first gear member or second gear member.

4. The reclining device according to claim 1, including an actuating member which receives an input force, the first gear member being supported on the actuator via a plurality of wedge shaped members and a spring.

5. The reclining device according to claim 1, wherein the number of gear teeth of the first gear is less than the number of teeth of the second gear.

6. A reclining device for a vehicle seat to change an angle of inclination of a seatback relative to a seat cushion, comprising:
   a first gear member secured to a first arm that is adapted to be fixed to one of the seatback and the seat cushion;
   a second gear member secured to a second arm adapted to be fixed to the other of the seatback and the seat cushion;
   a plurality of first gear teeth provided on the first gear member;
   a plurality of second gear teeth provided on the second gear member, the plurality of first gear teeth being different in number than the plurality of second gear teeth, and the first gear teeth and the second gear teeth being positioned eccentrically;
   a stopper member provided between the first gear member and the second gear member for restricting relative rotation between the first gear member and the second gear member;
   an engaging element provided on the first gear member; and
   a ring member encircling outer peripheral portions of the first gear member and the second gear member, the engaging element on the first gear member engaging a portion of the ring member so that at least a part of a contact force on the stopper member is transmitted to the ring member via the first gear member and the engaging element.

7. The reclining device according to claim 6, wherein the first gear member is secured to a lower arm that is adapted to be fixed to the seat cushion and the second gear member is secured to an upper arm that is adapted to be fixed to the seatback.

8. The reclining device according to claim 6, wherein the first gear member includes a plurality of engaging elements, each of the engaging elements being positioned in a respective hole in the ring member.

9. The reclining device according to claim 6, wherein the engaging element is a protuberance that is positioned in a hole in the ring member.

10. The reclining device according to claim 6, wherein the stopper member comprises a plurality of radially outwardly extending and spaced apart stoppers on an outer peripheral portion of one of the first and second gear members and a plurality of projections adapted to effect contact with the stoppers and provided on a side of the other of the first and second gear members.

11. The reclining device according to claim 10, wherein the engaging element is provided on one of the projections.

12. The reclining device according to claim 6, including an actuating member which receives an input force, the first gear member being supported on the actuator via a plurality of wedge shaped members and a spring.

13. The reclining device according to claim 6, wherein the plurality of first gear teeth is smaller in number than the plurality of second gear teeth.

14. A reclining device for a vehicle seat to change an angle of inclination of a seatback relative to a seat cushion, comprising:
   a first gear member secured to a first arm that is adapted to be fixed to one of the seatback and the seat cushion;
   a second gear member secured to a second arm adapted to be fixed to the other of the seatback and the seat cushion;
   a plurality of first gear teeth provided on the first gear member;

a plurality of second gear teeth provided on the second gear member, the plurality of first gear teeth being different in number than the plurality of second gear teeth, and the first gear teeth and the second gear teeth being positioned eccentrically;

a plurality of spaced apart stoppers on one of the first and second gear members and a plurality of spaced apart projections on the other of the first and second gear members which are adapted to effect contact with one another to restrict relative rotation between the first gear member and the second gear member;

an engaging element provided on the first gear member; and a ring member encircling outer peripheral portions of the first gear member and the second gear member, the ring member being provided with a hole in which is positioned the engaging element on the first gear member so that at least a part of a contact force between the stoppers and the projections is transmitted to the ring member via the first gear member and the engaging element.

15. The reclining device according to claim 14, wherein the first gear member is secured to a lower arm that is adapted to be fixed to the seat cushion and the second gear member is secured to an upper arm that is adapted to be fixed to the seatback.

16. The reclining device according to claim 14, wherein the first gear member includes a plurality of engaging elements and the ring member includes a plurality of holes, each of the engaging elements being positioned in one of the holes in the ring member.

17. The reclining device according to claim 14, wherein the engaging element is provided on one of the projections.

18. The reclining device according to claim 14, including an actuating member which receives an input force, the first gear member being supported on the actuator via a plurality of wedge shaped members and a spring.

19. The reclining device according to claim 14, wherein the plurality of first gear teeth is smaller in number than the plurality of second gear teeth.

* * * * *